United States Patent [19]
Shiba et al.

[11] 3,804,634
[45] Apr. 16, 1974

[54] PHOTOGRAPHIC SUPERSENSITIZED SILVER HALIDE EMULSION

[75] Inventors: Keisuke Shiba; Seiiti Kubodera; Takeo Sakai, all of Machi, Japan

[73] Assignee: Fuji Photo Film Co., Ltd., Kanagawa, Japan

[22] Filed: Mar. 20, 1972

[21] Appl. No.: 236,175

[30] Foreign Application Priority Data
Mar. 20, 1971 Japan.............................. 46-15679

[52] U.S. Cl...................... 96/125, 96/108, 96/110, 96/139, 96/140
[51] Int. Cl............................................... G03c 1/08
[58] Field of Search .............. 96/125, 108, 139, 140

[56] References Cited
UNITED STATES PATENTS

| 3,305,365 | 2/1967 | Takei et al............................ 96/108 |
| 3,655,394 | 4/1972 | Illingsworth ......................... 96/108 |
| 3,705,038 | 12/1972 | Philippaerts et al................. 96/140 |
| 3,706,566 | 12/1972 | Shiba et al............................ 96/140 |

Primary Examiner—J. Travis Brown
Attorney, Agent, or Firm—Sughrue, Rothwell, Mion, Zinn & Macpeak

[57] ABSTRACT

A photographic silver halide emulsion containing merocyanine dyes and cadmium salt, in which the spectral sensitizing activity is greatly strengthened is disclosed.

11 Claims, No Drawings

PHOTOGRAPHIC SUPERSENSITIZED SILVER HALIDE EMULSION

BACKGROUND OF THE INVENTION

1. Field of the Invention

This invention relates to a photographic silver halide emulsion which spectrally sensitized with a merocyanine dye. More particularly this invention relates to a photographic silver halide emulsion in which the spectral sensitization action is strengthened by incorporating a cadmium salt into the silver halide emulsion.

2. Description of the Prior Art

It is well known to use a merocyanine dye in order to sensitize spectrally a silver halide light-sensitive material. The spectral sensitization action obtained is dependent on not only the chemical structure and physical properties of the sensitizing dye, but also on the nature of the emulsion (e.g., the halogen composition, the crystal habit and the particle diameter of the silver halide, and the pAG and the pH of the emulsion) and the manner in which the chemical sensitization is carried out.

Further, the sensitization action is affected not only by the organic materials contained in the emulsion (e.g., gelatin, chemical sensitizers, stabilizers, antifogging agents, hydrophilic synthetic polymers, surface-active agents, color couplers, development accelerating agents, development controlling agents, hardening agents), but also by other metal ions which are contained in the silver halide or which are present on the surface of the silver halide, such as group VIII ions, gold ions, mercury ions, tallium ions, and copper ions.

Cyanine dyes are used, adsorbed on the silver halide particles in the state of J-aggregates, but they are also used, adsorbed on the silver halide particles in the state of isolated molecules at wave lengths longer than about 600 nm. In any case, high spectral sensitivity can be obtained by the combined use of valuable super sensitizing agents. In addition, as described in U.S. Pat. Nos. 2,816,029, 2,819,964 and 2,843,490, it is known that a trimethine cyanine dye and a monomethine cyanine dye provide a super sensitization action when cadmium chloride or cadmium bromide is present.

Merocyanine dye are generally more difficult to provide the super sensitizing effect than cyanine dyes. The merocyanine dyes which sensitize in the region of wave lengths shorter than about 600 nm are particularly difficult to provide the super sensitizing effect. However, merocyanine dyes less suffer from the antisensitization caused by organic materials also present because merocyanine dyes are able to adsorb more strongly on to the surface of the silver halide particles (particularly silver chloride and silver chlorobromide) than cyanine dyes. In addition, merocyanine dyes have an advantage that the color stains, which are caused by sensitizing dyes and remain after processing, are less evident than in case of cyanine dyes. Accordingly, it can be said that to find substances which result in a super sensitization to merocyanine dyes is of great concern in utilizing merocyanine dyes.

Heretofore, it has been believed in the art that merocyanine dyes do not show a super sensitization action even if they are combined with cadmium salts. Certainly, this is true for conventional emulsions (U.S. Pat. No. 2,843,490). The super sensitization caused by cyanine dyes and cadmium salts varies greatly according to minor differences in the chemical structures of the cyanine dyes, and this is markedly evidenced from the number of inventions which use cyanine dyes having peculiarly selected chemical structures (e.g., see G.B. Pat. No. 988,385, U.S. Pat. Nos. 2,816,029, 2,819,964, 2,843,490). Accordingly, the mechanism of the super sensitization action which occurs when both cadmium salts and merocyanine dyes are incorporated into silver halide emulsions has not been clarified.

It is known that cadmium salts cause a tone-contrasting effect, a stabilizing effect and a restraining effect when they are used in the process for the manufacturing of photographic emulsions (e.g., see Processing of the International Colloquium by A. Steigmann, Liege, 1959, pages 122–127; The Journal of Applied Physics, by L. E. Brady and J. F. Hamilton, Vol. 35, pages 1,565–1,569; The Journal of Photographic Science, by V. Platikanova, R. Stoicheva and J. Malinowsky, Vol. 15, 1967, pages 29 – 34). However, these known literature references do not suggest at all that merocyanine dyes show a super sensitizing action in the presence of cadmium salts.

A first object of the present invention is to obtain a photographic material having high spectral sensitivity and a relatively high contrast in the silver chlorobromide emulsion. A second object of the present invention is to obtain a photographic emulsion having a high green spectral sensitivity, having a low fogging density and having good storage stability, using as small an amount of cadmium salt as is possible. Other objects will be readily understood from the descriptions contained herein of the present invention.

SUMMARY OF THE INVENTION

The objects of this invention have been accomplished by using a silver halide emulsion containing a sensitizing combination of at least one merocyanine dye selected from those having the following general formula

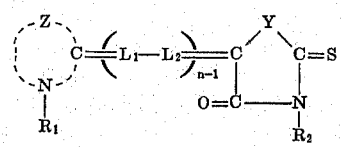

General Formula (I)

wherein $Z$ represents the atomic group necessary to form a heterocyclic nucleus, $L_1$ and $L_2$ represent a methine group, $R_1$ and $R_2$ each represents a hydrogen atom, an alkyl group having from 1 to about six carbon atoms; a substituted alkyl group such as a hydroxyalkyl group, a carboxyalkyl group, an alkoxycarbonylalkyl group, an aralkyl group, a sulfoalkyl group, and a morpholinoalkyl group; an alkenyl group; an aryl group and a substituted aryl group, $Y$ represents an oxygen atom, a sulfur atom or a $N — R'$ group, in which $R'$ is an alkyl group having from one to about six carbon atoms; a substituted alkyl group such as a hydroxy alkyl group, a carboxy alkyl group, an alkoxy carbonyl alkyl group; an aralkyl group, a sulfoalkyl group, and a morpholinoalkyl group; an alkenyl group, and $n$ is an integer of 1 or 2, and cadmium salt, with the mode of the silver halide particle diameter being not more than 0.7 micron, the halogen composition of silver halide being at least 50 mole percent chloride ion, and at least 80 wt. percent of the silver halide particles having the crystal (habit) of the phase (100).

The term "mode," designates the grain diameter of the most frequently occurring grains.

DETAILED DESCRIPTION OF THE INVENTION

As described above in the formula (I), Z represents an atomic group necessary to form a five-and/or six-membered heterocyclic nucleus which is used as a nucleus of a conventional cyanine dye, such as a tetrazole nucleus (e.g., tetrazole, 1-methyl-4-ethyltetrazole, 1-phenyl-4-ethyltetrazole, 1-methyl-4-allyltetrazole, 1-methyl-4-hydroxyethyltetrazole, 1-γ-sulfopropyl-4-methyltetrazole); a pyrrolidine nucleus, a pyridine nucleus (e.g., pyridine, 3-methylpyridine, 4-methylpyridine, 3,5-dimethylpyridine, 4-chloropyridine, 6-chloropyridine, 6-hydroxypyridine); a thiazole nucleus (e.g., thiazole, 4-methylthiazole, 5-methylthiazole, 4-phenylthiazole, 4,5-diphenylthiazole benzothiazole, 5-chlorobenzothiazole, 5-bromobinzothiazole, 5-iodobenzothiazole, 5-methylbenzothiazole, 5-ethylbenzothiazole, 5-methoxybenzothiazole, 5-phenylbenzothiazole, 5,6-dichlorobenzothiazole, 5,6-dibromobenzothiazole, 5-chloro-6-methylbenzothiazole, 5-ethyl-6-bromobenzothiazole, 5-methoxycarbonyl benzothiazole, 5-ethoxycarbonyl benzothiazole, 5-hydroxy benzothiazole, 5-trifluorobenzothiazole, α-naphthothiazole, β-naphthothiazole and β,β-naphthothiazole); a thiazoline nucleus (e.g., a thiazoline, 4-methylthiazoline and 4,4'-dimethylthiazoline); a selenazole nucleus (e.g., a selenozole, 4-phenylselenazole, 4-methylselenazole, benzoselenazole, 5-chlorobenzoselenazole, 5-bromobenzoselenazole, 5-methylbenzoselenazole, 5-methoxybenzoselenazole, 5-phenyl benzoselenazole, 5-methyl-6-chlorobenzoselenazole, 5-methoxy carbonylbenzoselenazole, 5-trifluorobenzoselenazole, α-naphthoselenazole, β-naphthoselenazole); an oxazole nucleus (e.g., oxazole 4-methyloxazole, 5-methyloxazole, 4,5-dimethyloxazole, 5-phenyloxazole, benzoxazole 5-methylbenzoxazole, 5-chlorobenzoxazole, 5-chloro-6-methylbenzoxazole, 5-methoxybenzoxazole, 5-phenylbenzoxazole, 5-methoxycarbonyl benzoxazole, α-napthoxazole, and β-naphthoxazole); an oxazoline nucleus (e.g., a oxazoline, and 4,4'-dimethyloxazoline); an indolenine nucleus (e.g., indolenine, 6-methylindolenine, 6-methoxyindolenine and 6-chloroindolenine) or an imidazole nucleus (e.g., a benzimidazole, 5,6-dichlorobenzimidazole, 5-methoxy-6-chlorobenzimidazole, 5-cyano benzimidazole and 5-trifluorobenzimidazole).

$L_1$ and $L_2$ each represents a methine group such as

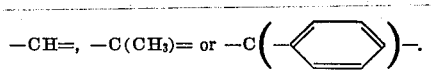

$R_1$ and $R_2$ each represents a hydrogen atom, an alkyl group with from one to six about carbon atoms (e.g., methyl, ethyl, n-propyl, isobutyl), a substituted alkyl group such as a hydroxyalkyl (e.g., β-hydroxyethyl), a carboxyalkyl (e.g., carboxymethyl), an alkoxycarbonylalkyl (e.g., methoxycarbonylmethyl), an aralkyl (e.g., benzyl, β-phenoxyethyl), a sulfoalkyl (e.g., β-sulfoethyl, 4-sulfobutyl) or a morpholinoalkyl (morpholinoethyl) group, an alkenyl group such as allyl, an aryl group such as a phenyl, or a substituted phenyl group, said substituent being e.g., halogen atom and an alkyl group.

Y represents an oxygen atom, a sulfur atom or a

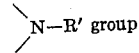

(where R' has the same meaning as $R_1$ or $R_2$ and represents alkyl group with one to about six carbon atoms, substituted alkyl, allyl except that R' is not an aryl or substituted aryl group).

$n$ represents an integer of 1 or 2.

Preferred embodiments of the merocyanine dyes of the General Formula (I) are represented by merocyanine dyes having the following general formulas.

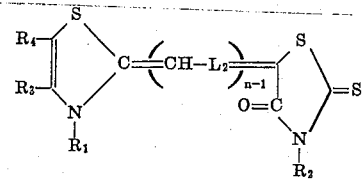

wherein $R_1$, $R_2$, $L_2$ and $n$ are described with respect to General Formula (I). $R_3$ and $R_4$ each may represent alkyl group having from one to about six carbon atoms, a sulfoalkyl group, a carboxyalkyl group, or a phenyl group and wherein $R_3$ and $R_4$ combine to form a benzene ring;

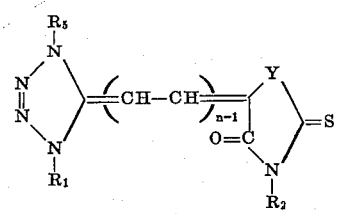

wherein $R_1$, $R_2$, $n$ and $y$ are as described with respect to General Formula (I), wherein $R_5$ represents an alkyl group having from one to six carbon atoms, a sulfoalkyl group, a phenyl group, benzyl group, or an allyl group;

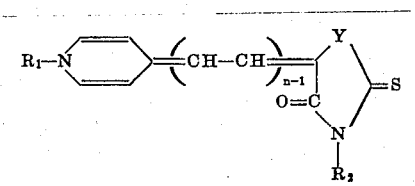

wherein $R_1$, $R_2$, $n$ and Y are as described with respect to General Formula (I).

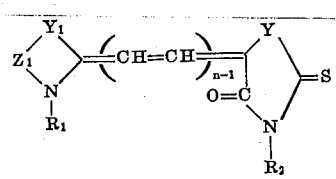

wherein $R_1$, $R_2$, $n$ and Y are as described with respect to General Formula (I). $Z_1$ represents an ethylene group, an ethylene group substituted by an alkyl group having from one to about six carbon atoms (e.g., —CH$_2$—CH$_2$—, —CH(CH$_3$)—CH(CH$_3$)—, —CH$_2$—C(CH$_3$)$_2$—) and Y represents an oxygen atom, a sulfur atom, a methylene group or, an alkyl substituted methylene group; and

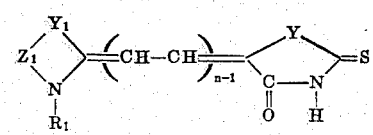

wherein $R_1$, $Y$, and $n$, are as described with respect to General Formula (I) and wherein $Y_1$ and $Z_1$ are as described above.

A characteristic of the present invention is the discovery that the combined use of a particular merocyanine dye and a cadmium salt produces a markedly super sensitization action in a certain limited region on the properties of silver halide particles. The super sensitization action is greatly dependent on the properties of the surface or subsurface of the silver halide grains, and this action is stronger, the higher the mole percent of the chloride ion. And, this action is remarkably weak when not less than 1 mole percent of iodide ion is present. As for the surface of the particles, the crystal habit of the phase (100) produces a larger supersensitization action than the crystal habit of the phase (111). In addition, the finer the particle diameter, the greater the super sensitization action becomes. Iodide may be incorporated in an amount of not more than 2 mole percent.

Cadmium ions are preferably added in the form of cadmium chloride or cadmium bromide. Cadmium nitrate or sulfate can be also used. It is preferable to add one part of cadmium salt in the course of formation (or during the precipitation) of the silver halide grains, that is, when the precipitate is formed, and to add the rest of the cadmium salt after physical ripening, particularly after chemical ripening and before addition of the merocyanine dyes. Sufficient spectral sensitivity can be obtained with a small amount of cadmium ion if addition is carried out in this manner.

As described above, the present invention is very important for spectral sensitizing techniques.

The cadmium salts used in the present invention are preferred in an amount of from about 0.001 to about 0.05 mole per 1 mole of silver salt, with from about 0.01 to about 0.05 mole being most preferred. The merocyanine dyes used in the present invention are preferred in an amount of from about $10^{-6}$ to about $10^{-3}$ mole per 1 mole of silver salt, about $10^{-5}$ to about $10^{-4}$ mole being most preferred.

Typical merocyanine dyes of the General Formula (I) used in the present invention are shown in the following, but the invention should not be interpreted as limited to these specific examples.

Dye (I)

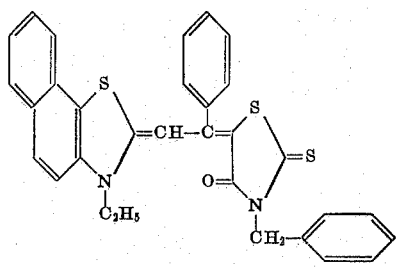

Dye (II)

Dye (III)

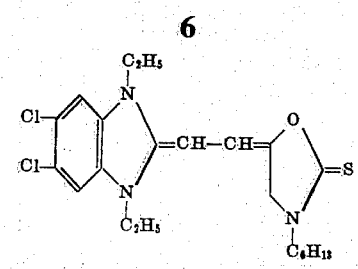

Dye (IV)

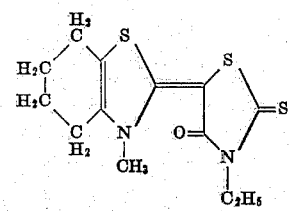

Dye (V)

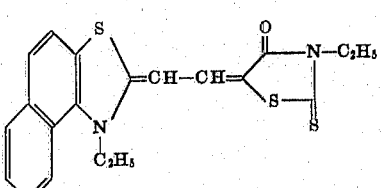

Dye (VI)

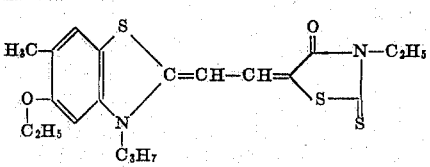

Dye (VII)

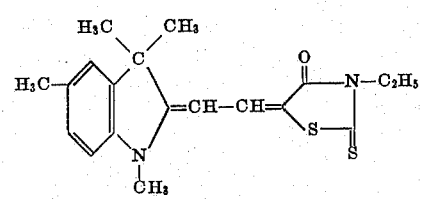

Dye (VIII)

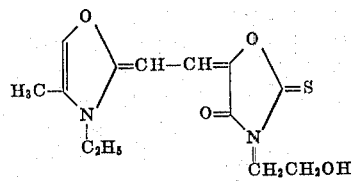

Dye (IX)

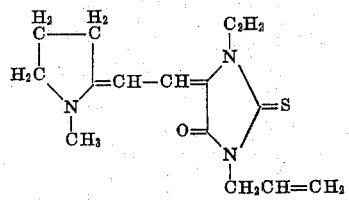

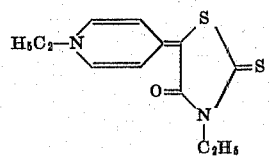

Dye (X)

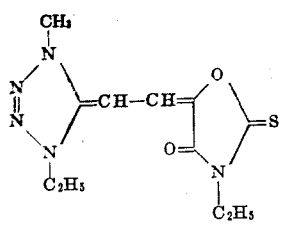

Dye (XI)

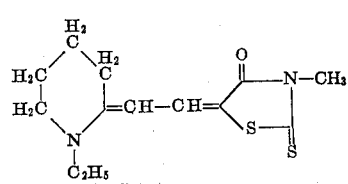

Dye (XII)

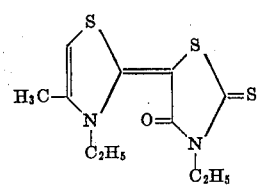

Dye (XIII)

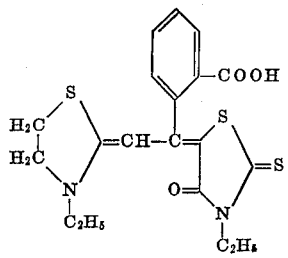

Dye (XIV)

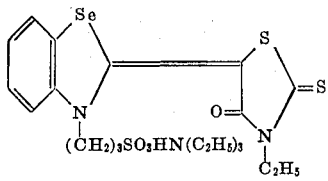

Dye (XV)

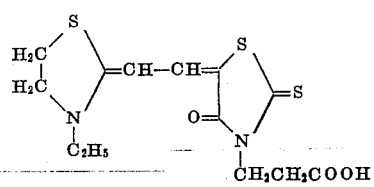

Dye (XVI)

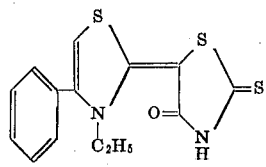

Dye (XVII)

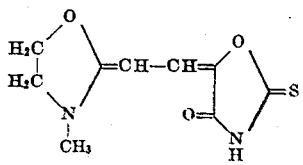

In the following comparison cyanine dyes used to illustrate the invention are shown.

Comparison Dye (A)

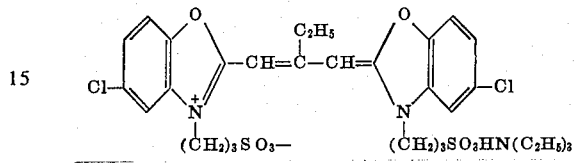

Comparison Dye (B)

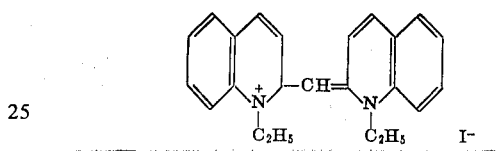

EXAMPLE 1

To a solution which was prepared by dissolving 30 g of gelatin in 500 cc of distilled water and which was kept at 70°C, there was added a solution which was prepared by dissolving 8.8 g of potassium bromide and 40 g of sodium chloride in 100 cc of distilled water and kept at 70°C, and a solution which was prepared by dissolving 100 g of silver nitrate in 200 cc of distilled water and kept at 68°C, at the same time, with stirring, over a 20 minute period. Thereafter, the resulting solution was ripened at 70°C for 20 minutes, and then 50 g of gelatin was added, followed by stirring for 15 minutes. The solution was washed with water in a conventional manner, and then a mixed solution containing a complex salt of gold trichloride and ammonium rhodanide (i.e., a solution containing 1.5 mg of gold trichloride plus a solution containing 5 mg of ammonium rhodanide), and a solution containing 2 mg of sodium thiosulfate, was added to ripen chemically. The emulsion (Em-A) obtained had the mode of a particle diameter of 0.5 micron, and substantially all the particles comprised cubic silver halide particles having the phase (100). The chloride ions were present in an amount of about 80 mole percent.

250 g of the emulsion prepared in a similar manner as described above, was weighed out, the amount of a 2N aqueous solution of cadmium chloride as set forth in Table 1 was added, and the resulting solution was heated at 70°C to melt. Thereto was added a amount of the merocyanine dye as set forth in Table 1, and the emulsion was stirred. A hardening agent and a coating acid were further added to the emulsion and then the emulsion was coated on a cellulose triacetate film in a dry thickness of 3 microns. The film was cut into strips, and these strips were exposed, using a tungsten light 2854°K), to a optical wedge, through a Filter No. K 31 made by the Fuji Photo Film Co., Ltd. and a Filter No. SC 46 made by the Fuji Photo Film Co., Ltd. Development was conducted at 20°C for 3 minutes, with the developing solution of the following composition being diluted with water in a ratio of 1:1.

Composition of the Developing Solution

| | |
|---|---|
| Water (about 50°C) | 500 cc |
| Metol | 3 g |
| Sodium Sulfite (anhydrous) | 45 g |
| Hydroquinone | 12 g |
| Sodium Carbonate (monohydrate) | 80 g |
| Potassium Bromide | 2 g |
| Water to make | 1000 cc |

After fixing, washing with water and drying, the optical density was measured with the aid of a sensitometer made by the Fuji Photo Film Co., Ltd., and the relative sensitivity was calculated at the point of a fogging density of +0.5. The results obtained are given in Table 1.

From the results shown in Table 1, it can be seen that the merocyanine dyes of the present invention provide Table 1

| No. | Emulsion | Amount of $CdCl_2$ Added ($\times 10^{-5}$ mole) | Amount of Sensitizing Dye Added (concentration of the solution $1\times10^{-3}$) | Sy (relative value) | Fog | $\lambda smax$ (nm) |
|---|---|---|---|---|---|---|
| 1 | Em-A | — | (I) 20 | 138 | 0.30 | |
| | | — | 40 | 138 | 0.57 | 605 |
| | | 2 | 20 | 270 | 0.29 | |
| | | 2 | 40 | 234 | 0.34 | |
| 2 | do. | — | (II) 40 | 308 | 0.25 | |
| | | — | 80 | 296 | 0.25 | 550 |
| | | 2 | 40 | 660 | 0.13 | |
| | | 2 | 80 | 675 | 0.15 | |
| 3 | do. | — | (IV) 20 | 123 | 0.24 | |
| | | — | 40 | 155 | 0.32 | |
| | | 2 | 20 | 211 | 0.14 | 605 |
| | | 2 | 40 | 251 | 0.07 | |
| 4 | do. | — | (V) 20 | 200 | 0.23 | |
| | | — | 40 | 240 | 0.30 | 595, |
| | | 2 | 20 | 276 | 0.18 | 540 |
| | | 2 | 40 | 355 | 0.26 | |
| 5 | do. | — | (VI) 40 | 380 | 0.12 | |
| | | — | 80 | 372 | 0.16 | |
| | | 2 | 40 | 758 | 0.22 | 590 |
| | | 2 | 80 | 645 | 0.07 | |
| 6 | do. | — | (VII) 40 | 282 | 0.23 | |
| | | — | 80 | 355 | 0.25 | |
| | | 2 | 40 | 390 | 0.23 | 535 |
| | | 2 | 80 | 426 | 0.24 | |
| 7 | do. | — | (X) 40 | 162 | 0.22 | |
| | | — | 80 | 214 | 0.14 | |
| | | 2 | 40 | 204 | 0.16 | 485 |
| | | 2 | 80 | 288 | 0.12 | |
| 8 | do. | — | (XI) 40 | 372 | 0.23 | |
| | | — | 80 | 467 | 0.28 | |
| | | 2 | 40 | 575 | 0.12 | 500 |
| | | 2 | 80 | 500 | 0.09 | |
| 9 | do. | — | (XII) 40 | 105 | 0.18 | |
| | | — | 80 | 170 | 0.09 | |
| | | 2 | 40 | 126 | 0.11 | 470 |
| | | 2 | 80 | 224 | 0.05 | |
| 10 | do. | — | (XIII) 40 | 536 | 0.25 | |
| | | — | 80 | 501 | 0.12 | |
| | | 2 | 40 | 832 | 0.13 | 550 |
| | | 2 | 80 | 795 | 0.12 | |
| 11 | do. | — | (XIV) 40 | 141 | 0.22 | |
| | | — | 80 | 200 | 0.23 | 480 |
| | | 2 | 40 | 200 | 0.11 | |
| | | 2 | 80 | 289 | 0.13 | |
| 12 | do. | — | (XV) 40 | 467 | 0.20 | |
| | | — | 80 | 480 | 0.23 | 540 |
| | | 2 | 40 | 550 | 0.14 | |
| | | 2 | 80 | 537 | 0.16 | |
| 13 | do. | — | (A) 20 | 293 | 0.19 | |
| | | — | 40 | 362 | 0.19 | |
| | | — | 80 | 490 | 0.19 | 555 |
| | | 2 | 40 | 512 | 0.11 | |
| | | 2 | 80 | 675 | 0.07 | |

Table 1

| No. | Emulsion | Amount of CdCl$_2$ Added ($\times 10^{-5}$ mole) | Amount of Sensitizing Dye Added (concentration of the solution $1\times10^{-3}$) | Sy (relative value) | Fog | $\lambda$smax (nm) |
|---|---|---|---|---|---|---|
| 14 | do. | — | (B) 20 | 50 | 0.35 | |
| | | — | 40 | 50 | 0.29 | |
| | | — | 80 | 50 | 0.27 | 580 |
| | | 2 | 40 | 63 | 0.12 | |
| | | 2 | 80 | 93 | 0.12 | | remarkable super sensitization in the presence of cadmium chloride, and that this degree is the same or greater than that of the Comparison Cyanine dye (A) or (B). Further, it can be understood that fogging is decreased in the case of the merocyanine dyes.

EXAMPLE 2

A control silver chlorobromide emulsion (Em-B) was prepared in a manner similar to that described in Example 1 with the exception that 20 g of potassium bromide, 2 g of cadmium bromide (tetrahydrate) and 40 g of sodium chloride were used. The mode of the particle diameter was 0.6 micron, and the cubic crystals having the phase (100) were contained in an amount of about 60 wt. percent.

The emulsion (Em-C) was prepared in a similar manner as described above with the exception that sulfuric acid was used to lower the pH to 4.0 and thereby to form precipitates and that sodium hydroxide was used to adjust the pH to 6.5 when ripening chemically. The mode of the particle diameter was 0.35 micron, and cubic crystals having the phase (100), were contained in an amount of about 85 wt. percent.

As in Example 1, the emulsions were subjected to sensitometry evaluation. The results obtained are given in Table 2.

From the results contained in Table 2, it can be seen that the strong color sensitization action caused by the cadmium salt and the merocyanine dye, is dependent on the crystal habit of the silver halide crystals contained in the emulsion.

The silver halide emulsion of the present invention can be subjected to sulfur sensitization (refer, for example, to U.S. Pat. Nos. 1,574,944, 2,278,947, 2,440,206, and 3,189,458) reduction sensitization (refer, for example, to U.S. Pat. Nos. 2,518,698, 2,419,974 and 2,983,610) gold sensitization (refer, for example, to U.S. Pat. Nos. 2,540,085, 2,597,856 and 2,597,915) and the like. Further, the emulsion can contain other metal ions such as VIII Group metal ions (e.g., platinum cobalt, nickel, rhodium, lead, iridium), gold ions, mercury ions, thallium ions or copper ions in order to adjust the tone, to stabilize and to prevent fogging. In addition, the emulsion can contain organic stabilizers (refer, for example, to U.S. Pat. Nos. 2,384,593, 2,708,162 and 2,403,937) organic antifogging agents (ibid.), developing agents, such as hydroquinone derivatives and 3-pyrazolidine derivatives, development accelerating agents (refer, for example, to U.S. Pat. Nos. 2,423,549, 2,441,389, 2,784,091 and 2,271,623) and couplers, as is conventional in the art.

Table 2

| No. | Emulsion | Amount of CdCl$_2$ Added ($\times 10^{-5}$ mole) | Amount of Sensitizing Dye Added, (cc) (conc. of solution $1\times10^{-3}$) | Sy (relative value) | SB (relative value) | Fog | samax (nm) |
|---|---|---|---|---|---|---|---|
| 15 | Em-B | 0 | — | — | 100 | 0.42 | |
| | | 1 | — | — | 116 | 0.35 | |
| | | 2 | — | — | 122 | 0.30 | — |
| | | 4 | — | — | 112 | 0.20 | |
| 16 | | — | (VIII) 20 | 35 | 100 | 0.42 | |
| | | — | 40 | 44 | 112 | 0.42 | |
| | | — | 80 | 63 | 123 | 0.45 | 495 |
| | | 2 | 40 | 25 | 61 | 0.25 | |
| | | 2 | 80 | 35 | 61 | 0.25 | |
| 17 | Em-C | — | (VIII) 20 | 44 | 100 | 0.35 | |
| | | — | 40 | 65 | 125 | 0.42 | |
| | | — | 80 | 72 | 112 | 0.42 | 495 |
| | | 2 | 40 | 92 | 141 | 0.35 | |
| | | 2 | 80 | 115 | 141 | 0.30 | |
| 18 | | — | (XVI) 40 | 20 | 112 | 0.45 | |
| | | — | 80 | 25 | 112 | 0.31 | |
| | | 2 | 40 | 45 | 224 | 0.20 | 460 |
| | | 2 | 80 | 72 | 235 | 0.22 | |
| 19 | | — | (XVII) 40 | 66 | 66 | 0.28 | |
| | | — | 80 | 63 | 63 | 0.30 | 485 |
| | | 2 | 40 | 152 | 126 | 0.20 | |
| | | 2 | 80 | 178 | 132 | 0.25 | |

The emulsion used can be coated on an appropriate support such as polyethylene terephthalate film, acetate film, glass dry plate, baryta paper, synthetic paper, or resin laminated paper.

The merocyanine dyes of the present invention and the cadmium salts can be used together with other super sensitizers, cyanine dyes and rhodacyanine dyes, as is conventional in the art (e.g., see U.S. Pat. Nos. 2,430,558, 2,977,229, 2,972,539, 3,397,981, and 3,416,927, and French Pat. No. 1,457,158). The emulsion can also be used in new photographic systems such as silver dye bleaching methods, diffusion transfer photographic processes (color, black and white) and electron ray recording systems.

What is claimed is:

1. A photographic silver halide emulsion containing a sensitizing combination of at least one merocyanine dye selected from the group consisting of compounds represented by the following general Formula (I)

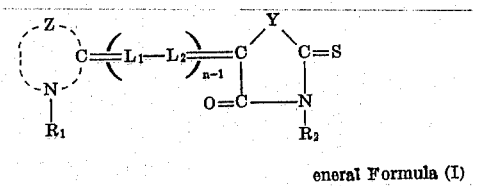

eneral Formula (I)

wherein Z represents an atomic group necessary to form a five-and/or six-membered heterocyclic nucleus selected from the group consisting of a tetrazole nucleus, a pyrrolidine nucleus, a pyridine nucleus, a thiazole nucleus, a thiazoline nucleus, a selenazole nucleus, an oxazole nucleus, an oxazoline nucleus, an indolenine nucleus and an imidazole nucleus, $L_1$ and $L_2$ each represents a methine group, $R_1$ and $R_2$ each represent a hydrogen atom, an alkyl group having from 1 to about 6 carbon atoms, a substituted alkyl group, said substituent being selected from the group consisting of a hydroxy group, a carboxy group, an alkoxy carbonyl group, an aryl group, a sulfo group and a morpholino group, an alkenyl group, an aryl group, and a substituted aryl group, said substituent being selected from the group consisting of a halogen atom and an alkyl group Y represents an oxygen atom, sulfur atom or a $$\diagdown N-R' \text{ group}$$

in which R' represents an alkyl group with from one to about six carbon atoms, a substituted alkyl group, said substituents being as defined for said substituted alkyl group for $R^1$ and $R^2$, or an allyl group, and n represents an integer of 1 or 2, and a cadmium salt, in which the mode of the silver halide particle diameter is not more than 0.7 micron, the halogen composition of the silver halide is at least 50 molar percent chloride ions, and at least 80 percent by weight of the silver halide particles have the crystal habit of the phase (100).

2. A photographic silver halide emulsion according to claim 1 wherein said cadmium salt is cadmium halide.

3. A photographic silver halide emulsion according to claim 2, wherein said cadmium halide is cadmium chloride.

4. A photographic silver halide emulsion according to claim 1, additionally containing Group VIII metal salts.

5. A photographic silver halide emulsion according to claim 4, wherein said Group VIII metal salts are platinum salts, iridium salts, lead salts, rhodium salts or nickel salts.

6. A photographic silver halide emulsion according to claim 1, wherein said merocyanine dye is selected from the group consisting of compounds having the general formulas:

(a) 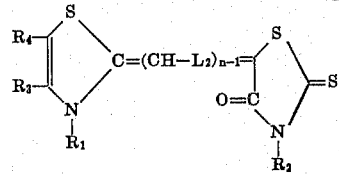

wherein $R_1$, $R_2$, $L_2$ and n are as described in claim 1. $R_3$ and $R_4$ each represents an alkyl group having from one to about six carbon atoms, a sulfoalkyl group, a carboxyalkyl group, or a phenyl group, and wherein $R_3$ and $R_4$ may combine to form a benzene ring, (b) 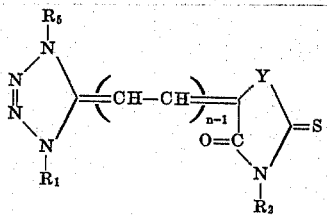

wherein $R_1$, $R_2$, n and Y are as described in claim 1, wherein $R_5$ represents an alkyl group having from one to about six carbon atoms, a sulfoalkyl group, a phenyl group, a benzyl group, or an allyl group, (c) 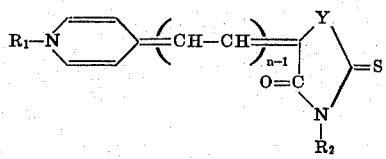

wherein $R_1$, $R_2$ n and Y are as described in claim 1, (d) 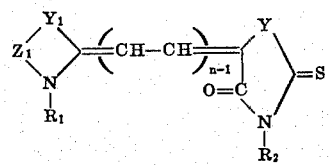

wherein $R_1$, $R_2$, n and Y are as described in claim 1, $Z_1$ represents an ethylene group an ethylene group substituted by an alkyl group having from one to about six carbon atoms and Y represents an oxygen atom, a sulfur atom, a methylene group or an alkyl-substituted methylene group, and (e) 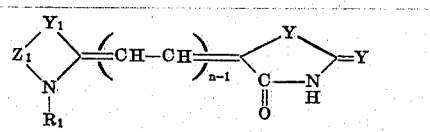

wherein $R_1$, Y, and $n$, are as described in claim 1 and wherein $Y_1$ and $Z_1$ are as described above.

7. A photographic silver halide emulsion according to claim 1, wherein said silver halide particles contain not more than 2 molar percent iodide ions of the total halide incorporated therein.

8. A photographic silver halide emulsion according to claim 1, wherein said cadmium salt is present at a level ranging from about 0.001 to about 0.05 mole per mole of silver halide and wherein said dye is present at a level ranging from about $10^{-6}$ to about $10^{-3}$ mole per mole of silver halide.

9. A photographic silver halide emulsion according to claim 8, wherein said cadmium salt level ranges from about 0.01 to about 0.05 and wherein said dye level ranges from about $10^{-5}$ to about $10^{-4}$.

10. A photographic silver halide emulsion according to claim 8, wherein part of said cadmium salt is added during formation of said silver halide particles and the remainder of said cadmium salt is added after physical ripening.

11. A photographic silver halide light sensitive element comprising a support and having coated thereon a layer of the photographic silver halide emulsion of claim 1.

* * * * *